United States Patent
Kumar et al.

(10) Patent No.: US 11,673,355 B2
(45) Date of Patent: Jun. 13, 2023

(54) METHOD OF MANUFACTURE OF A LENS WITH GRADIENT PROPERTIES USING IMBIBITION TECHNOLOGY

(71) Applicant: Transitions Optical, Ltd., Tuam (IE)

(72) Inventors: Anil Kumar, Murrysville, PA (US); Brian Smyth, Tuam (IE); David John Park, Tuam (IE)

(73) Assignee: Transitions Optical, Ltd., Tuam (IE)

( * ) Notice: Subject to any disclaimer, the term of this patent is extended or adjusted under 35 U.S.C. 154(b) by 971 days.

(21) Appl. No.: 16/469,785

(22) PCT Filed: Dec. 23, 2016

(86) PCT No.: PCT/EP2016/082587
§ 371 (c)(1),
(2) Date: Jun. 14, 2019

(87) PCT Pub. No.: WO2018/113999
PCT Pub. Date: Jun. 28, 2018

(65) Prior Publication Data
US 2019/0358919 A1    Nov. 28, 2019

(51) Int. Cl.
*B29D 11/00* (2006.01)
*G02C 7/02* (2006.01)
*G02C 7/10* (2006.01)

(52) U.S. Cl.
CPC .. *B29D 11/00653* (2013.01); *B29D 11/00644* (2013.01); *G02C 7/024* (2013.01); *G02C 7/102* (2013.01); *G02C 7/105* (2013.01)

(58) Field of Classification Search
CPC ........ B29D 11/00653; B29D 11/00644; G02C 7/024; G02C 7/102; G02C 7/105
See application file for complete search history.

(56) References Cited

U.S. PATENT DOCUMENTS

| | | | |
|---|---|---|---|
| 4,108,827 A | * | 8/1978 | La Liberte ........ C08F 299/0478 524/398 |
| 4,731,264 A | | 3/1988 | Lin et al. |
| 4,756,973 A | | 7/1988 | Sakagami et al. |
| 5,096,457 A | | 3/1992 | Nakagawa et al. |

(Continued)

FOREIGN PATENT DOCUMENTS

| | | |
|---|---|---|
| WO | 9420581 A1 | 9/1994 |
| WO | 2016016681 A1 | 2/2016 |

(Continued)

*Primary Examiner* — Mathieu D Vargot
(74) *Attorney, Agent, or Firm* — The Webb Law Firm

(57) ABSTRACT

A method of producing an optical article includes applying an imbibition composition having at least one dye onto at least a portion of at least one imbibable surface (45) of a substrate (20) to form a coated substrate (10). The method further includes irradiating at least a portion of the coated substrate with heat from a heat source (80) to form a heat gradient across the coated substrate (10) to diffuse the at least one dye into the imbibable surface to form an at least partially imbibed substrate having a dye concentration gradient corresponding to the heat gradient. The method further includes removing a residual component of the imbibition composition from the at least partially imbibed substrate. The dye concentration gradient forms a gradient pattern upon exposure to actinic radiation.

14 Claims, 4 Drawing Sheets

(56) References Cited

U.S. PATENT DOCUMENTS

| | | | |
|---|---|---|---|
| 5,130,353 A | 7/1992 | Fischer et al. | |
| 5,134,191 A | 7/1992 | Takarada et al. | |
| 5,231,156 A | 7/1993 | Lin | |
| 5,462,806 A | 10/1995 | Konishi et al. | |
| 5,560,751 A | 10/1996 | Hoshiyama | |
| 5,645,767 A | 7/1997 | Van Gemert | |
| 5,867,316 A | 2/1999 | Carlson et al. | |
| 5,882,774 A | 3/1999 | Jonza et al. | |
| 6,096,375 A | 8/2000 | Duderkirk et al. | |
| 6,113,813 A * | 9/2000 | Goudjil | G03C 1/685 |
| | | | 252/589 |
| 6,296,375 B1 | 10/2001 | Sung et al. | |
| 6,296,785 B1 | 10/2001 | Nelson et al. | |
| 6,433,043 B1 | 8/2002 | Misura et al. | |
| 6,713,536 B2 | 3/2004 | Misura et al. | |
| 7,097,303 B2 | 8/2006 | Kumar et al. | |
| 7,147,889 B2 | 12/2006 | Misura et al. | |
| 7,256,921 B2 | 8/2007 | Kumar et al. | |
| 7,342,112 B2 | 3/2008 | Kumar et al. | |
| 7,374,282 B2 | 5/2008 | Tendler | |
| 7,452,611 B2 | 11/2008 | Blackburn et al. | |
| 8,012,386 B2 | 9/2011 | Clerc | |
| 8,172,393 B2 | 5/2012 | Tendler | |
| 8,608,988 B2 | 12/2013 | Bowles et al. | |
| 8,651,660 B2 | 2/2014 | Barzak et al. | |
| 2004/0006835 A1 | 1/2004 | Kubodera et al. | |
| 2008/0187760 A1 | 8/2008 | Wiand | |
| 2009/0135462 A1 | 5/2009 | Kumar et al. | |
| 2011/0135850 A1 | 6/2011 | Saha et al. | |
| 2015/0219931 A1 | 8/2015 | Grasso | |
| 2015/0253465 A1 | 9/2015 | Trapani et al. | |

FOREIGN PATENT DOCUMENTS

| | | |
|---|---|---|
| WO | 2016142496 A1 | 9/2016 |
| WO | 2017013012 A1 | 1/2017 |

\* cited by examiner

METHOD OF MANUFACTURE OF A LENS WITH GRADIENT PROPERTIES USING IMBIBITION TECHNOLOGY

CROSS-REFERENCE TO RELATED APPLICATION

This application is the United States national phase of International Application No. PCT/EP2016/082587 filed Dec. 23, 2016, the disclosure of which is hereby incorporated by reference in its entirety.

BACKGROUND OF THE INVENTION

Field of the Invention

The present invention relates generally to a method of manufacturing an optical article, such as an optical lens, and specifically to a method of manufacturing an optical lens having gradient properties using imbibition technology wherein an imbibition dye concentration gradient of a diffused imbibition dye forms a gradient pattern on at least a portion of the optical lens upon exposure to actinic radiation. The present invention also relates to an optical article having such gradient properties.

Description of the Related Art

With optical articles, such as optical lenses, one or more surfaces may be subjected to a treatment to enhance the overall performance and function of the optical articles. Examples of such treatments include the formation of one or more coatings on a surface of an optical substrate, such as a primer coating, a hard coating, a photochromic coating, and/or an antireflection coating. The one or more coatings can be applied using a number of known techniques. One technique includes dissolving or dispersing the compound within the surface of a substrate, e.g., imbibition of an imbibition dye into the substrate by immersion of the substrate in a hot solution containing the imbibition dye or by depositing the imbibition composition comprising the imbibition dye on the surface of the substrate and thermally transferring the imbibition dye into the substrate. The term "imbibition" or "imbibe" is intended to mean and include permeation of the imbibition dye into the substrate, solvent assisted transfer absorption of the imbibition dye into the substrate, vapor phase transfer and other such transfer mechanisms.

It is known in the art to prepare optical articles where the optical article includes gradient properties. The gradient properties on a surface of the optical article, such as a gradient tint effect, provide a functional advantage in that the optical article generally has a higher color density at a first portion of the lens, such as a top portion of the lens, for improved distance viewing with less color density at a second portion of the lens, such as a bottom of the lens. The gradient tinting effect also adds an aesthetic effect for fashion and style.

Gradient properties on the surface of the optical article may be achieved using a number of different techniques. In some examples, a portion of an optical substrate may be immersed into a liquid coating composition. After the optical substrate is pulled out of the liquid coating composition, the liquid coating composition forms a coating layer on the immersed surface of the optical substrate. This process requires precise and reproducible processing to a higher degree than is required for solid tinting or coloring. While methods have been developed to overcome these processing difficulties, such methods often require additional manufacturing steps, thus adding additional manufacturing costs. Accordingly, there is a need in the art for new and improved methods of producing optical articles with gradient properties.

SUMMARY OF THE INVENTION

In view of the existing need in the art, it would be desirable to develop new methods of producing optical articles using imbibition technology to provide gradient properties to the optical article. It would be further desirable to provide a cost-effective method of preparing the optical article where gradient properties can be formed on at least one surface of the optical article in a controlled and predetermined manner.

A method of producing an optical article may include applying an imbibition composition having at least one dye onto at least a portion of at least one imbibable surface of a substrate to form a coated substrate. The method further may include irradiating at least a portion of the coated substrate with heat from a heat source to form a heat gradient across the coated substrate to diffuse the at least one dye into the imbibable surface to form an at least partially imbibed substrate having a dye concentration gradient corresponding to the heat gradient. The method further may include removing a residual component of the imbibition composition from the at least partially imbibed substrate. The dye concentration gradient may form a gradient pattern upon exposure to actinic radiation.

The imbibable surface may be a surface of an imbibable substrate. In other examples, the imbibable surface may be a surface of an imbibable layer located on the optical article. In further examples, the imbibable layer may be provided on an imbibable substrate. The heat gradient may be altered by increasing or decreasing a heat output of the heat source, by increasing or decreasing a distance between the substrate and the heat source, by increasing or decreasing an angle between the substrate and the heat source, and/or by increasing or decreasing a time of exposure of the substrate to the heat from the heat source. A central portion of the heat source may be offset relative to a central portion of the substrate. The imbibition composition may be applied by a method selected from the group consisting of spin coating, spray coating, inkjet coating, curtain coating, or dip coating. The heat source may be selected from the group consisting of an infrared heat source, a convection heat source, and a microwave heat source. The heat source may be curved.

The at least one dye may be selected from the group consisting of a fixed tint dye, a photochromic dye, a dichroic dye, and a photochromic dichroic dye. The substrate may be an anisotropic imbibable substrate and the imbibition composition may include at least one dichroic dye such that the at least partially imbibed substrate has a polarized gradient pattern. In other examples, the substrate may be an anisotropic imbibable substrate and the imbibition composition may have at least one photochromic dichroic dye such that the at least partially imbibed substrate has a photochromic polarized gradient pattern upon exposure to actinic radiation. The imbibition composition further may include at least one of an ultraviolet absorber composition, an antioxidant composition, hydroxypropyl cellulose, a hindered amine light stabilizer, a kinetic enhancing additive, and a solvent.

These and other features and characteristics of methods of producing optical articles described herein will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only.

BRIEF DESCRIPTION OF THE DRAWINGS

In FIGS. 1-5, the same characters represent the same components unless otherwise indicated.

DETAILED DESCRIPTION OF THE INVENTION

Figure 1:
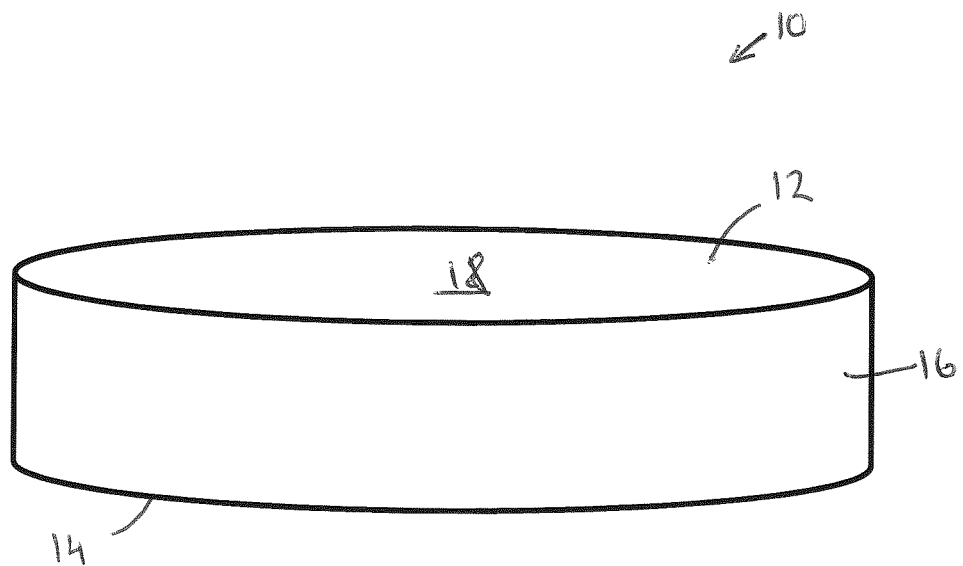
FIG. 1 is a representative perspective view of an optical article in accordance with some examples of the present invention.

As used herein, the singular form of "a", "an", and "the" includes plural referents unless the context clearly dictates otherwise.

As used herein, spatial or directional terms, such as "left", "right", "up", "down", "inner", "outer", "above", "below", and the like, relate to various features as depicted in the drawing figures. However, it is to be understood that various alternative orientations can be assumed and, accordingly, such terms are not to be considered as limiting.

Unless otherwise indicated, all ranges or ratios disclosed herein are to be understood to encompass any and all subranges or subratios subsumed therein. For example, a stated range or ratio of "1 to 10" should be considered to include any and all subranges between (and inclusive of) the minimum value of 1 and the maximum value of 10; that is, all subranges or subratios beginning with a minimum value of 1 or more and ending with a maximum value of 10 or less, such as but not limited to, 1 to 6.1, 3.5 to 7.8, and 5.5 to 10.

Other than in the operating examples, or where otherwise indicated, all numbers expressing quantities of ingredients, reaction conditions, and so forth used in the specification and claims are to be understood as modified in all instances by the term "about."

As used herein, the term "substantially parallel" means a relative angle as between two objects (if extended to theoretical intersection), such as elongated objects and including reference lines, that is from 0° to 5°, or from 0° to 3°, or from 0° to 2°, or from 0° to 1°, or from 0° to 0.5°, or from 0° to 0.25°, or from 0° to 0.1°, inclusive of the recited values.

All documents, such as but not limited to issued patents and patent applications, referred to herein, and unless otherwise indicated, are to be considered to be "incorporated by reference" in their entirety.

As used herein, the term "optical" means pertaining to or associated with light and/or vision. For example, according to various non-limiting examples disclosed herein, the optical element, article or device can be chosen from ophthalmic elements, articles, and devices; display elements, articles, and devices; visors; windows; and mirrors.

As used herein, the term "ophthalmic" means pertaining to or associated with the eye and vision. Non-limiting examples of ophthalmic articles or elements include corrective and non-corrective lenses, including single vision or multi-vision lenses, which may be either segmented or non-segmented multi-vision lenses (such as, but not limited to, bifocal lenses, trifocal lenses, and progressive lenses), as well as other elements used to correct, protect, or enhance (cosmetically or otherwise) vision, including without limitation, contact lenses, intra-ocular lenses, magnifying lenses, and protective lenses or visors.

As used herein, the term "substrate" or "optical substrate" means lenses, partially formed lenses, and lens blanks.

As used herein, the term "heat" means energy applied to an article or an object by conductive, convective, and/or radiation means to cause a temperature of the article to increase or decrease relative to a temperature of its surroundings, or to cause a temperature of a first portion of the article to increase or decrease relative to a second portion of the article.

As used herein, the term "gradient" means a measure of change in a light-influencing zone on a surface of an article.

As used herein, the term "imbibition" refers to a process of diffusing or permeating a dye material into a host material or coating by a heat-assisted transfer, and the like. The term "imbibition dye" refers to a dye material capable of diffusing or permeating into a host material or coating by a heat-assisted transfer, and the like.

As used herein, the term "coating" means a supported film derived from a flowable composition, which may or may not have a uniform thickness, and specifically excludes polymeric sheets.

As used herein, the term "photochromic" and similar terms means having an absorption spectrum for at least visible radiation that varies in response to absorption of at least actinic radiation. Further, as used herein, the term "photochromic material" means any substance that is adapted to display photochromic properties (i.e. adapted to have an absorption spectrum for at least visible radiation that varies in response to absorption of at least actinic radiation) and which includes at least one photochromic compound.

As used herein, the term "dichroic" means capable of absorbing one of two orthogonal plane polarized components of at least transmitted radiation more strongly than the other.

As used herein, the term "photochromic-dichroic" refers to materials that display photochromic properties and dichroic properties in response to at least actinic radiation. For example, a photochromic-dichroic material may be adapted to reversibly switch from a first optically clear, non-polarizing state in at least the visible spectrum to a second colored, polarizing state in at least the visable spectrum in response to at least actinic radiation.

As used herein to modify the term "state," the terms "first" and "second" are not intended to refer to any particular order or chronology, but instead refer to two different conditions or properties. For purposes of non-limiting illustration, the first state and the second state of a photochromic compound of a photochromic layer can differ with respect to at least one optical property, such as but not limited to the absorption of visible and/or UV radiation. Thus, according to various non-limiting examples disclosed herein, the photochromic compound of a photochromic layer can have a different absorption spectrum in each of the first and second state. For example, while not limiting herein, the photochromic compound of a photochromic layer can be clear in the first state and colored in the second state. Alternatively, the photochromic compound of a photochromic layer can have a first color in the first state and a second color in the second state.

The term "hue," as used herein, means pure color in terms, such as "green", "red", or "magenta", and includes mixtures of two pure colors like "red-yellow" (i.e., "orange"), or "yellow-green". The term "color density," as used herein, means upon exposure to actinic radiation, optical density of an area of the optical element surface printed with the colorant composition. A higher color density results in a lower percent light transmittance. For purposes of this invention, the bottom of the lens is closest to the lens wearer's cheekbone, and the top of the lens is closest to the lens wearer's forehead. This linearly gradient color pattern should be differentiated from radially gradient color patterns known in the art, e.g., those used in connection with lenses, wherein color density varies radially outward from a center point to the outer perimeter of the lens.

Optical Article

The present disclosure is generally directed to an optical article 10. The optical article 10 can be selected from ophthalmic articles or elements, display articles or elements, visors, windows, mirrors, active liquid crystal cell articles or elements, and passive liquid crystal cell articles or elements. Examples of ophthalmic articles or elements include, but are not limited to, corrective and non-corrective lenses, including single vision or multi-vision lenses, which can be either segmented or non-segmented multi-vision lenses (such as, but not limited to, bifocal lenses, trifocal lenses, and progressive lenses), as well as other elements used to correct, protect, or enhance (cosmetically or otherwise) vision, including without limitation, contact lenses, intra-ocular lenses, magnifying lenses, and protective lenses or visors. Examples of display articles, elements and devices include, but are not limited to, screens, monitors, and security elements, including without limitation, security marks and authentication marks. Examples of windows include, but are not limited to, automotive and aircraft transparencies, filters, shutters, and optical switches.

With reference to FIG. 1, the optical article 10 has a forward or top surface 12, a rearward or bottom surface 14, and a side surface 16 extending between the top surface 12 and the bottom surface 14. When the optical article 10 is an ophthalmic lens, the bottom surface 14 is opposed to the eye of an individual wearing the optical article 10, the side surface 16 typically resides within a supportive frame, and the top surface 12 faces incident light (not shown), at least a portion of which passes through the optical article 10 and into the individual's eye. With some examples, at least one of the top surface 12, the bottom surface 14, and the side surface 16 may have various shapes including, but not limited to, round, flat, cylindrical, spherical, planar, substantially planar, plano-concave and/or plano-convex, and curved, including, but not limited to, convex, and/or concave.

The optical article 10 has an optical substrate 20 with one or more coatings or compositions deposited on, formed on, or imbibed into at least one surface of the optical substrate 20. The optical substrate 20 can be made of various materials including, but not limited to, organic materials, inorganic materials, or combinations thereof (for example, composite materials). The optical substrate 20 can, with some examples, be an optical or ophthalmic substrate. At least a portion of the optical substrate 20 may have at least one imbibable surface. The phrase "imbibable surface" refers to a physical surface of the optical substrate 20 and/or a surface of a coating deposited on the optical substrate 20 that is capable of diffusing or permeating a dye material into the physical surface of the optical substrate 20 and/or the surface of the coating deposited on the optical substrate 20 by a heat-assisted transfer. As described herein, the coating applied over at least a portion of the optical substrate 20 can be at least one coating or composition applied over at least a portion of at least one major imbibable surface of the optical substrate 20. The at least one coating or composition can also be applied over the entire imbibiable surface of the optical substrate 20. As used herein, the term "coating" means a supported film derived from a flowable composition, which may or may not have a uniform thickness.

The optical article 10 can comprise any of the optical substrates well known in the art. The substrate may comprise a polymeric organic material chosen from thermosetting polymeric organic materials, thermoplastic polymeric organic materials, or a mixture of such polymeric organic materials. The polymeric organic material can be chosen from poly($C_1$-$C_{12}$ alkyl methacrylates), poly(oxyalkylene dimethacrylates), poly(alkoxylated phenol methacrylates), cellulose acetate, cellulose triacetate, cellulose acetate propionate, cellulose acetate butyrate, poly(vinyl acetate), poly (vinyl alcohol), poly(vinyl chloride), poly(vinylidene chloride), thermoplastic polycarbonates, polyesters, polyurethanes, polythiourethanes, polysulfithiourethanes, poly(urea-urethane), poly(ethylene terephthalate), polystyrene, poly(alpha methylstyrene), copoly(styrene-methylmethacrylate), copoly(styrene-acrylonitrile), polyvinyl butyral or polymers prepared from bis(allyl carbonate) monomers, polyfunctional acrylate monomers, polyfunctional methacrylate monomers, diethylene glycol dimethacrylate monomers, diisopropenyl benzene monomers, ethoxylated bisphenol A dimethacrylate monomers, ethylene glycol bismethacrylate monomers, poly(ethylene glycol) bismethacrylate monomers, ethoxylated phenol bismethacrylate monomers, alkoxylated polyhydric alcohol polyacrylate monomers, styrene monomers, urethane acrylate monomers, glycidyl acrylate monomers, glycidyl methacrylate monomers, diallylidene pentaerythritol monomers, or mixtures of such monomers.

Substrates suitable for use in the preparation of optical articles 10 of the present invention typically demonstrate a refractive index of at least 1.55 and can include non-plastic substrates, such as glass. More often, substrates commonly used in optical applications are used, including polyol(allyl carbonate) monomers, e.g., allyl diglycol carbonates such as diethylene glycol bis(allyl carbonate), which monomer is sold under the registered trademark CR-39 by PPG Industries, Inc.; poly(urea)urethane polymers, which are prepared, for example, by the reaction of a polyurethane prepolymer and a diamine curing agent, a composition for one such polymer being sold under the registered trademark TRIVEX by PPG Industries, Inc.; polyol(meth)acryloyl terminated carbonate monomer; diethylene glycol dimethacrylate monomers; ethoxylated phenol methacrylate monomers; diisopropenyl benzene monomers; ethoxylated trimethylol propane triacrylate monomers; ethylene glycol bismethacrylate monomers; poly(ethylene glycol) bismethacrylate monomers; urethane acrylate monomers; poly(ethoxylated bisphenol A dimethacrylate); poly(vinyl acetate); poly(vinyl alcohol); poly(vinyl chloride); poly(vinylidene chloride); polyethylene; polypropylene; polyurethanes; polythiourethanes; thermoplastic polycarbonates, such as the carbonate-linked resin derived from bisphenol A and phosgene, one such material being sold under the registered trademark LEXAN by Sabic Global Technologies; polyesters, such as the material sold under the registered trademark MYLAR by Dupont Teijin Films; poly(ethylene terephthalate); polyvinyl butyral; poly(methyl methacrylate), such as the material sold under the registered trademark PLEXIGLAS by Arkema France Corporation, and polymers prepared by reacting polyfunctional isocyanates with polythiols or polyepisulfide monomers, either homopolymerized or co- and/or terpolymerized with polythiols, polyisocyanates, polyisothiocyanates, and, optionally, ethylenically unsaturated monomers or halogenated aromatic-containing vinyl monomers. Also contemplated are copolymers of such monomers and blends of the described polymers and copolymers with other polymers, e.g., to form interpenetrating network products.

Imbibition Composition

As described herein, the method of the present invention includes applying an imbibition composition having at least one imbibition dye onto at least one surface of the optical substrate 20. Imbibition of dyes into an imbibable surface of a substrate can include a step of applying, onto at least a portion of imbibable substrate, an imbibition composition comprising one or more imbibition dyes selected from photochromic material, conventional dye, dichroic material, and/or photochromic-dichroic material. The imbibition composition is then heated such that at least a portion of the imbibition dyes is diffused or imbibed into the imbibable surface of the substrate. The remaining residual materials can be washed from the surface of the imbibed substrate. Non-limiting methods of imbibition are described in U.S. Pat. Nos. 6,433,043; 6,713,536; and 7,147,889, the disclosures of which are incorporated in their entirety by reference herein.

In some examples, the method of the present invention includes applying an imbibition composition comprising at least one imbibition dye onto at least a portion of the exterior surface 18 of an imbibable substrate 20 to form a coated substrate with a removable (or temporary) coating. The coated substrate can be treated, such as by irradiation with heat, to cause the at least one imbibition dye to diffuse into the substrate. Any remaining residual materials can be removed, leaving an imbibed substrate having an imbibed dye layer. For example, the imbibition composition may be applied over the entire exterior imbibable surface, such as the exterior surface 18 corresponding to the top surface 12 of the optical substrate 20. The imbibition composition may be conformal to the exterior imbibable surface 18 or it may form a planar surface over the exterior surface 18. When the imbibition composition is conformal to the exterior imbibable surface 18, the topography of the exterior surface 18 is maintained on a surface of the imbibition composition that is opposite to a surface at the interface between the imbibition composition and the exterior imbibable surface 18. The imbibition composition may be applied over at least a portion of the exterior imbibable surface 18 of the optical substrate 20 using one or more coating devices and techniques, as described herein.

Imbibition compositions according to various examples of the present invention can, with some examples, optionally further include kinetic enhancing additives (KEAs), photoinitiators, and thermal initiators. With some examples, the imbibition compositions optionally contain additives for: flow and wetting, flow control agents, e.g., poly(2-ethylhexyl)acrylate; adjuvant resin to modify and optimize coating properties; antioxidants; hindered amine light stabilizers; hydroproxyl cellulose; and ultraviolet (UV) light absorbers. Examples of useful antioxidants, hindered amine light stabilizers, and UV light absorbers include those available commercially from BASF under the trademarks IRGANOX and TINUVIN. These optional additives, when used, are typically present in amounts up to 10 percent by weight (e.g., from 0.05 to 5 percent by weight).

Imbibition compositions according to various examples of the present invention can, with some examples, optionally further include a solvent. Examples of suitable solvents include, but are not limited to, water, acetates, alcohols, ketones, glycols, ethers, aliphatics, cycloaliphatics and aromatics. Examples of acetates include, but are not limited to, ethyl acetate, butyl acetate, and glycol acetate. Examples of ketones include, but are not limited to, methyl ethyl ketone, and methyl-N-amyl ketone. Examples of aromatics include, but are not limited to, toluene, naphthalene, and xylene. In an example, one or more solvents are added to each of the first reactant and the second reactant. Suitable solvent blends can include, for example, one or more acetates, propanol and its derivatives, one or more ketones, one or more alcohols, and/or one or more aromatics. If present, the solvent is typically present in an amount of from 5 to 60 percent by weight, or 5 to 40 percent by weight, or 10 to 25 percent by weight, based on the total weight of the imbibition composition (inclusive of the solvent weight).

With some examples, the solvent may be an aqueous solvent, organic solvent or mixture of such solvents, a polymeric resin or a mixture of solvents and a polymeric resin. Examples of solvent-carriers include water, benzene, toluene, methyl ethyl ketone, acetone, ethanol, tetrahydrofurfuryl alcohol, n-methylpyrrolidone, 2-ethoxyethyl ether, 2-methoxyethyl ether, xylene, cyclohexane, 3-methyl cyclohexanone, ethyl acetate, tetrahydrofuran, methanol, methyl propionate, ethylene glycol, acetonitrile, butanol, methylisobutyl ketone, methylchloroform, isopropanol and mixtures of such solvents. Examples of polymeric resins include hydroxy ($C_1$-$C_3$)alkyl celluloses, poly(vinyl pyrrolidone) (PVP); mixtures of from 5 to 50 parts of hydroxy ($C_1$-$C_3$) alkyl celluloses and from 95 to 50 parts of PVP, polyvinyl chloride, polyvinyl acetate, polyvinylbutyral, copolymers of vinyl chloride and vinyl acetate, copolymers of vinyl chloride and vinylidene chloride, polyvinyl propionate, cellulose acetate butyrate, and mixtures of such polymeric resins. When the carrier in the imbibition composition is a polymeric resin, the resin essentially serves as a film-forming binder for the other components of the composition.

With some examples, the imbibition composition can include a static dye, a photochromic material, or a combination thereof. Classes and examples of static dyes that can be present in the imbibition composition include, but are not limited to, art-recognized inorganic static dyes and organic static dyes. The static dyes can be present in the imbibition composition, and/or the optical substrate 20, in amounts (or ratios) such that the optical article 10 exhibits desired optical properties. For purposes of non-limiting illustration, the amount and types of static dyes can be selected such that the optical article 10 has a permanent gradient of color/hue corresponding to a heat gradient, as described herein. The amount of static dyes incorporated into the imbibition composition may range from 0.1 to 99.9 weight percent based on the weight of the composition. The precise amount of the static dyes is not critical, provided that a sufficient amount is used to produce the desired effect. The particular amount of the static dyes used can depend on a variety of factors, such as but not limited to, the absorption characteristics of the static dues, the color and intensity of the color, and the method used to incorporate the static dyes into a particular layer. Although not limiting herein, according to various non-limiting examples disclosed herein, the static dyes that are incorporated into a layer of the optical element can be configured to contribute to an optical article having 5% to 100% light transmittance, such as 10% to 95% transmittance, 15% to 90% transmittance, or 25% to 75% transmittance. The same transmittance ranges are applicable with regard to the static dyes that are alternatively or additionally incorporated into the optical substrate 20 of the optical article 10.

Classes of photochromic compounds that can be present in the imbibition composition include, but are not limited to, "conventional photochromic compounds." As used herein, the term "conventional photochromic compound" includes both thermally reversible and non-thermally reversible (or photo-reversible) photochromic compounds. Generally, although not limiting herein, when two or more conventional photochromic materials are used in combination with each other, the various materials can be chosen to complement one another to produce a desired color or hue. For example, mixtures of photochromic compounds can be used according to certain non-limiting examples disclosed herein to attain certain activated colors, such as a near neutral gray or near neutral brown. See, for example, U.S. Pat. No. 5,645,767, at column 12, line 66 to column 13, line 19, the disclosure of which is specifically incorporated by reference herein, which describes the parameters that define neutral gray and brown colors.

Examples of photochromic materials or compounds that can be present in the imbibition composition include, but are not limited to, indeno-fused naphthopyrans, naphtho[1,2-b]pyrans, naphtho[2,1-b]pyrans, spirofluoroeno[1,2-b]pyrans, phenanthropyrans, quinolinopyrans, fluoroanthenopyrans, spiropyrans, benzoxazines, naphthoxazines, spiro(indoline)naphthoxazines, spiro(indoline)pyridobenzoxazines, spiro(indoline)fluoranthenoxazines, spiro(indoline)quinoxazines, fulgides, fulgimides, diarylethenes, diarylalkylethenes, diarylalkenylethenes, thermally reversible photochromic compounds, and non-thermally reversible photochromic compounds, and mixtures thereof.

Further examples of photochromic compounds that can be present in the imbibition composition can, with some examples, be selected from certain indeno-fused napthopyran compounds, such as described in U.S. Pat. No. 6,296,785, at column 3, lines 66 through column 10, line 51, which disclosure is incorporated herein by reference.

The photochromic compounds can be present in the imbibition composition, and/or the optical substrate 20, in amounts (or ratios) such that the optical article 10 of the present disclosure exhibits desired optical properties. For purposes of non-limiting illustration, the amount and types of photochromic compounds can be selected such that the optical article 10 is clear or colorless when the photochromic compounds are in the closed-form (e.g., in the bleached or unactivated state), and can exhibit a desired resultant color when the photochromic compounds are in the open-form (e.g., when activated by actinic radiation). The precise amount of the photochromic compounds that are utilized is not critical, provided that a sufficient amount is used to produce the desired effect. The particular amount of the photochromic compounds used can depend on a variety of factors, such as but not limited to, the absorption characteristics of the photochromic compounds, the color and intensity of the color desired upon activation, and the method used to incorporate the photochromic compounds into a particular layer. Although not limiting herein, according to various non-limiting examples disclosed herein, the photochromic compounds that are incorporated into a layer of the optical element can be configured to contribute to an optical article having 5% to 100% light transmittance when activated, such as 10% to 95% transmittance when activated, 15% to 90% transmittance when activated, or 25% to 75% transmittance when activated. The same transmittance ranges are applicable with regard to the photochromic compounds that are alternatively or additionally incorporated into the optical substrate 20 of the optical article 10 of the present disclosure.

The amount of photochromic compound incorporated into the imbibition composition may range from 0.1 to 99.9 weight percent based on the weight of the composition. In one series of contemplated embodiments in which the imbibition composition is a combination of KEA and photochromic compound, the amount of photochromic compound ranges from 25 to 99 weight percent, from 50 to 98 weight percent, or from 70 to 97 weight percent. The amount of photochromic compounds used in the imbibition composition of the present invention may range between any combination of these values, inclusive of the recited ranges, e.g., from 0.15 to 99.85 weight percent.

In a particular example of the present invention, where the imbibition composition comprises a material selected from the group consisting of a dichroic dye, a photochromic-dichroic dye, and mixtures thereof, the optical substrate 20 comprises an alignment layer that is capable of diffusing and aligning the dichroic dye and/or the photochromic-dichroic dye. The alignment layer can comprise an ordered liquid crystal material having an irreversibly fixed first general direction, and the dichroic dye and/or the photochromic-dichroic dye can be aligned in a second general direction which is parallel to the first general direction. Non-limiting examples of such alignment layers comprising ordered liquid crystal materials are described in U.S. Pat. No. 7,256,921 at column 82, line 62 to column 84, line 11, the cited portions of which are incorporated by reference herein.

Also, the alignment layer can comprise a polymeric sheet oriented in a first general direction, and the dichroic dye and/or the photochromic-dichroic dye can be aligned in a second general direction which is parallel to the first general direction. In a particular embodiment of the present invention, the alignment layer can be linearly polarizing and can comprise an oriented polymeric sheet of polyvinyl alcohol, vinyl butyral, polyethylene terephthalate, polyalkyl(meth)acrylate, polyamide, poly(amide-ether) block copolymers, poly(ester-ether) block copolymers, poly(ether-urethane) block copolymers, poly(ester-urethane) block copolymers, and/or poly(ether-urea) block copolymers. The term "oriented polymeric sheet" as used herein means a polymeric sheet which has at least a first general direction (of alignment), such a first general direction imparted to the sheet by stretching.

The alignment layer can be linearly polarizing and may comprise an optical quality polymeric sheet or film comprised of a disperse phase of polymeric particles disposed within a continuous birefringent matrix which film can be oriented in one or more directions. The size and shape of the disperse phase particles, the volume fraction of the disperse phase, the film thickness and the amount of orientation are chosen to attain a desired degree of diffuse reflection and total transmission of radiation of a desired wavelength in the film. Such sheets/films and their preparation are described in U.S. Pat. No. 5,867,316 at column 6, line 47, to column 20, line 51, the cited portion of which is incorporated herein by reference. The alignment layer when linearly polarizing also may comprise the birefringent multilayer optical films described in U.S. Pat. No. 5,882,774, at column 2, line 63, to column 18, line 31, the cited portion of which is incorporated herein by reference. Further, the alignment layer also can comprise a two-component polarizer (i.e., dichroic and reflective polarizing components) such as that described in U.S. Pat. No. 6,096,375 at column 3, line 7 to column 19, line 46, the cited portion of which is incorporated herein by reference.

The dichroic material and/or the photochromic-dichroic material, when present in the imbibition composition, are aligned in a second general direction, i.e., along the long-axis of the dichroic compound and/or the photochromic-dichroic compound, and the second general direction is parallel to at least the first general direction of the alignment layer. As used herein with reference to order or alignment of a material or structure, the term "general direction" refers to the predominant arrangement or orientation of the material, compound or structure. Further, it will be appreciated by those skilled in the art that a material, compound or structure can have a general direction even though there is some variation within the arrangement of the material, compound or structure, provided that the material, compound or structure has at least one predominate arrangement.

Imbibition compositions used in the process of the present invention may further comprise additional conventional ingredients that impart desired physical characteristics to the composition or the resultant layer; that are required for the process used to apply the imbibition composition to the substrate; and/or that enhance the layer made therefrom. Such additional ingredients include rheology control agents, e.g., silica, and leveling agents, e.g., surfactants.

The imbibition composition, i.e., KEA, photochromic compounds, and optional ingredients, such as adjuvants and other conventional ingredients can be prepared by any conventional technique. For example, the individual components may be mixed and used neat or may be dissolved in appropriate solvents before combining or each of the components may be sequentially dissolved or incorporated into a suitable carrier, with heat, if necessary.

The optical elements prepared by the method of and according to the present disclosure can optionally include one or more layers applied over the imbibed dye layer of the imbibed substrate after the remaining residual materials have been removed. Examples of such additional layers include, but are not limited to: primer coatings and films; protective coatings and films, including transitional coatings and films and abrasion resistant coatings and films; anti-reflective coatings and films; polarizing coatings and films; and combinations thereof. As used herein, the term "protective coating or film," refers to coatings or films that can prevent wear or abrasion, provide a transition in properties from one coating or film to another, protect against the effects of polymerization reaction chemicals, and/or protect against deterioration due to environmental conditions such as moisture, heat, ultraviolet light, oxygen, etc.

As used herein, the term "transitional coating and film," means a coating or film that aids in creating a gradient in properties between two coatings or films, or a coating and a film. For example, although not limiting herein, a transitional coating can aid in creating a gradient in hardness between a relatively hard coating and a relatively soft coating. Non-limiting examples of transitional coatings include radiation-cured, acrylate-based thin films as described in U.S. Pat. No. 7,452,611 B2, which are hereby specifically incorporated by reference herein.

As used herein, the term "abrasion resistant coating and film," refers to a protective polymeric material that demonstrates a resistance to abrasion that is greater than a standard reference material, e.g., a polymer made of CR-39® monomer available from PPG Industries, Inc, as tested in a method comparable to ASTM F-735 Standard Test Method for Abrasion Resistance of Transparent Plastics and Coatings Using the Oscillating Sand Method. Non-limiting examples of abrasion resistant coatings include, for example, abrasion-resistant coatings comprising organosilanes, organosiloxanes, abrasion-resistant coatings based on inorganic materials such as silica, titania and/or zirconia, organic abrasion-resistant coatings of the type that are ultraviolet light curable, oxygen barrier-coatings, UV-shielding coatings, and combinations thereof. Non-limiting examples of commercial hard coating products include CRYSTALCOAT™ 124 and HI-GARD® coatings, available from SDC Coatings, Inc. and PPG Industries, Inc., respectively.

The abrasion resistant coating or film (or hard coat layer) can, with some examples, be selected from art-recognized hard coat materials, such as organo-silane abrasion-resistant coatings. Organo-silane abrasion-resistant coatings, often referred to as hard coats or silicone-based hard coatings, are well known in the art, and are commercially available from various manufacturers, such as SDC Coatings, Inc. and PPG Industries, Inc. Reference is made to U.S. Pat. No. 4,756,973 at column 5, lines 1-45; and to U.S. Pat. No. 5,462,806 at column 1, lines 58 through column 2, line 8, and column 3, line 52 through column 5, line 50, which disclosures describe organo-silane hard coatings and which disclosures are incorporated herein by reference. Reference is also made to U.S. Pat. Nos. 4,731,264, 5,134,191, 5,231,156, and International Patent Publication WO 94/20581 for disclosures of organo-silane hard coatings, which disclosures are also incorporated herein by reference. The hard coat layer can be applied by art-recognized coating methods such as, but not limited to, roll coating, spray coating, curtain coating, and spin coating.

Non-limiting examples of antireflective coatings and films include a monolayer, multilayer or film of metal oxides, metal fluorides, or other such materials, which can be deposited onto the articles disclosed herein (or onto films that are applied to the articles), for example, through vacuum deposition, sputtering, etc. Non-limiting examples of conventional photochromic coatings and films include, but are not limited to, coatings and films comprising conventional photochromic materials.

The imbibed dye layer of the imbibed substrate and other optional films and/or layers (such as but not limited to the one or more additional coating layers) that are formed on or over the imbibed substrate each have clarity at least sufficient so as to allow observance of a source of electromagnetic energy through the optical article 10 and a reflection of the electromagnetic energy incident on a surface of the optical article 10. With some examples, the imbibed substrate and one or more additional layers each independently have a percent transmittance of greater than 0 percent and less than or equal to 100 percent, such as from 50 percent to 100 percent. With additional examples, the imbibed substrate and one or more additional coating layers have reflectance at least sufficient so as to allow a reflection of at least a portion of electromagnetic energy incident on the exterior surface of the optical article 10.

Generally the thickness of the imbibed dye layer in the imbibed substrate and/or the one or more additional coating layers can be any thickness necessary to achieve the desired thickness for the optical article of manufacture. For example, the thickness of the imbibed dye layer in the imbibed substrate and/or the one or more additional coating layers can be from 2 microns to 60 microns, from 10 microns to 40 microns, or from 20 microns to 30 microns. The imbibed dye layer and/or the one or more additional coating layers can have the same or different thickness.

The imbibition composition and optional ingredients can be prepared by any conventional technique. For example, the individual components may be mixed and used neat; or may be dissolved in appropriate solvents before combining; or each of the components may be sequentially dissolved or incorporated into a suitable carrier, with heat, if necessary. Alternatively, multiple-imbibition composition and imbibing steps may be used to produce the photochromic article of the present invention. In one contemplated embodiment, a first imbibition composition is used for the photochromic compounds and stabilizers, a second includes the KEA, and a third imbibition composition includes both the photochromic compound(s) and KEA(s).

Gradient Pattern

As described herein, the optical article 10 is configured to exhibit a gradient pattern on at least one surface thereof. In some examples, an imbibition composition having at least one imbibition dye is applied over the optical substrate to form a coated substrate. The coated substrate is then irradiated such that an imbibition dye concentration gradient is formed. The imbibition dye concentration gradient may form at least one light influencing zone defining a gradient pattern 50 (shown in FIG. 2). As used herein, the term "light influencing zone" refers to a portion of an optical article 10 having a capability to exhibit one or more optical properties when light contacts or traverses through the optical article 10. Non-limiting examples of light influencing properties include photochromic and/or photochromic-dichroic reversible changes, color/tint, polarization, or combinations thereof.

The imbibition composition having at least one imbibition dye can be applied over the imbibable surface of the optical substrate 20 to form at least one light influencing zone with a gradient photochromic and/or photochromic-dichroic reversible change after the imbibition dye(s) of the imbibition composition are imbibed into to the optical substrate 20. As used herein, "gradient photochromic and/or photochromic-dichroic reversible change" refers to an increase or decrease in the magnitude or degree of a color/tint and/or polarization change throughout the at least one light influencing zone when exposed to at least actinic radiation. To provide a gradient photochromic and/or photochromic-dichroic reversible change, the imbibition composition can have different amounts of photochromic materials and/or photochromic-dichroic materials throughout the at least one light influencing zone. As will be appreciated, the use of photochromic materials and photochromic-dichroic materials to provide gradient polarization and/or color/tint will also provide a gradient photochromic and/or photochromic-dichroic reversible change.

The imbibition composition having at least one imbibition dye, can be applied over the optical substrate 20 to form at least one light influencing zone with a gradient color/tint after the imbibition dye(s) of the imbibition composition are imbibed into the imbibable surface of the optical substrate 20. As used herein, "gradient color/tint" refers to an increase or decrease in the magnitude or degree of color/tint throughout the at least one light influencing zone. To provide gradient color/tint, the imbibition composition can have different amounts of dyes throughout the at least one light influencing zone.

In some examples, the imbibition composition is applied onto the imbibable surface of the optical substrate 20 to form at least one light influencing zone with gradient polarization after the imbibition dye(s) of the imbibition composition are imbibed into to the optical substrate 20. As used herein, "gradient polarization" refers to an increase or decrease in the magnitude or degree of polarization throughout the at least one light influencing zone. To provide gradient polarization, an anisotropic material in the alignment layer can have different amounts of aligned dichroic materials and/or different amounts of aligned photochromic-dichroic materials throughout the at least one light influencing zone. The amount of aligned dichroic and/or photochromic-dichroic materials can be varied by the current method, e.g., by incorporating different amounts of dichroic and/or photochromic-dichroic materials throughout the at least one light influencing zone.

The optical article 10 can comprise two or more light influencing zones with different light influencing properties. As such, the optical article 10 of the present invention can comprise two or more light influencing zones with different photochromic and/or photochromic-dichroic reversible changes, different color/tint, different polarization properties, or any combination thereof.

Figure 2:
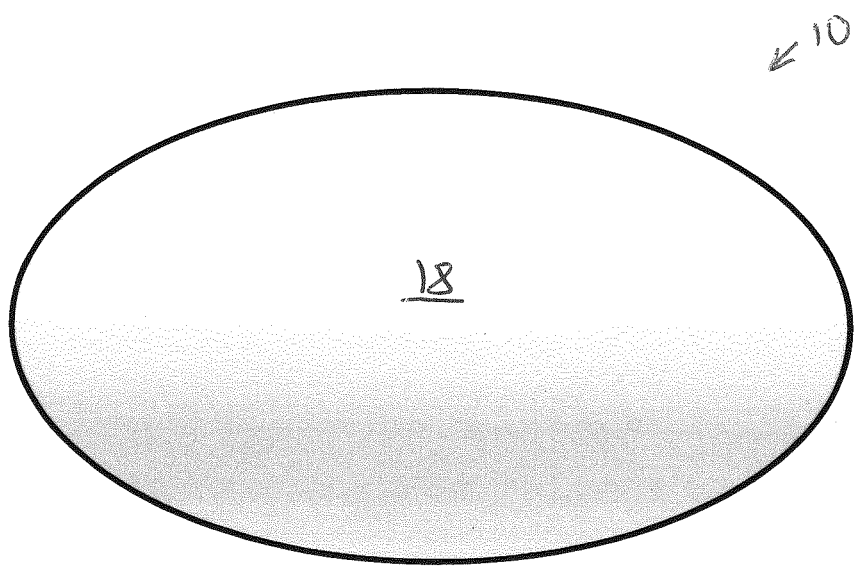
FIG. 2 is a top view of an optical article with a gradient pattern over a top surface of the optical article in accordance with some examples of the present invention.

As shown in FIG. 2, the gradient tint and/or gradient polarization of the optical article 10 can extend over an entire surface of the optical article 10. For instance, in FIG. 2, the tint and/or polarization gradient extends from the top of the optical article 10, where the tint is lightest and/or where there is the least polarization, or where no tint and/or polarization is present, to the bottom of the optical article 10, where the tint is darkest and/or where there is the most polarization. In some examples, the top portion of the optical article 10 may have 90% to 60% transmittance when activated, while the bottom portion of the optical article 10 may have 10% to 60% transmittance when activated. However, in other examples, the tint gradient and/or the polarization gradient can extend over only part of the surface of the optical article 10.

The optical article 10 can be formed with any combination of the previously described non-limiting light influencing zones and properties. Further, the optical article can comprise any desired number of light influencing zones including, but not limited to, two or more, three or more, or four or more light influencing zones. The number and types of light influencing zones can be selected based on the desired use of the optical article 10.

Coating Apparatus and Process

Before applying the imbibition composition to the optical substrate 20, the surface of the optical substrate 20 is preferably cleaned. Cleaning may be accomplished by washing the surface with an aqueous medium, e.g., soapy water, to remove dust and dirt; washing the surface with an organic solvent such as methylethylketone to remove any organic film present on the surface; and/or eliminating static charges that are present on the surface of the optical substrate 20.

The optical substrate 20 may be subjected to additional surface pre-treatment steps. Pre-treatment steps may include, without limitation, plasma, flame, chemical (e.g. caustic) or any treatment for raising the surface energy of the substrate so that the first coating wets the optical substrate and promotes adhesion to the optical substrate. For example, the optical substrate may be treated with a corona discharge from a Tantec EST-Electrical Service Treatment unit operating at 500 Watts and 54 kVA for 30 to 90 seconds to activate the surface of the substrate, as described in U.S. Pat. No. 8,608,988.

Figure 3:
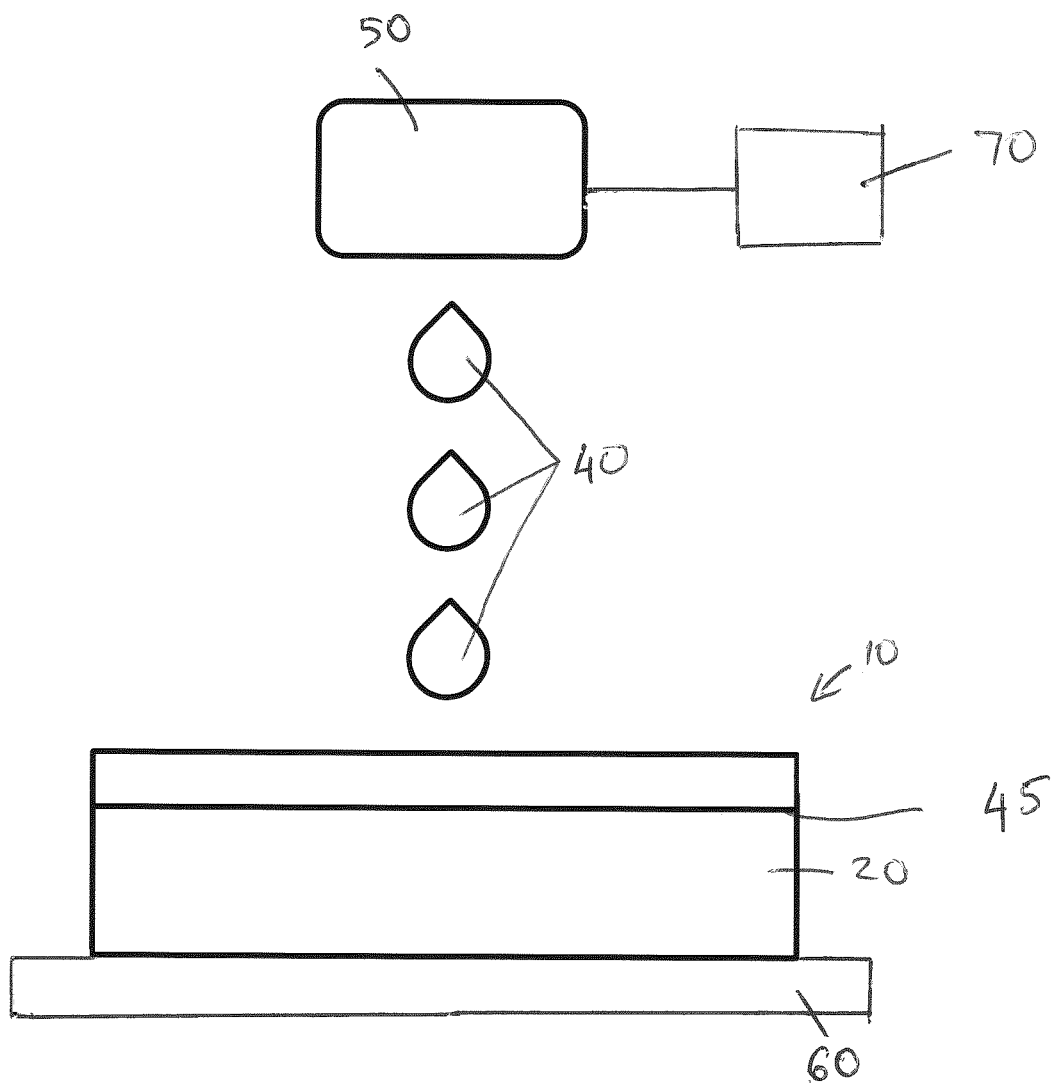
FIG. 3 is a representative side view of a coating apparatus for applying one or more coatings on an optical article.

With reference to FIG. 3, the optical article 10 can be made using a coating apparatus 50. The coating apparatus 50 is configured for applying a coating material, such as an imbibition composition comprising at least one imbibition dye, on an imbibable surface, such as one or more imbibable surfaces of the optical substrate 20. The coating apparatus 50 is configured to deposit one or more droplets 40 of the coating material, either continuously or on-demand, on at least one imbibable surface of the optical substrate 20. A controller may control the volume of coating material that is applied to the optical substrate 20. In various examples, the coating apparatus 50, may be an inkjet coating apparatus, an ultrasonic nozzle coating apparatus, a spray coat apparatus, a spin coat apparatus, a dip coat apparatus, or a curtain coat apparatus. Specific non-limiting examples of such coating apparatus are described in PCT/EP2016/066896 and PCT/EP2016/055201, the disclosures of which are incorporated by reference herein. It is appreciated that the coating apparatus 50 may be configured as a combination of various devices configured for applying a coating onto at least one surface of the optical substrate 20.

When applied to the at least one surface of the optical substrate 20, the one or more droplets 40 form a coating that, when irradiated with heat, can diffuse the imbibition dye(s) into the imbibable surface of the optical substrate 20. In various examples, a thickness of the imbibition composition coating may be from a minimum of 1 μm to a maximum of 100 μm, preferably 10 μm to 50 μm. In examples where coating is applied on a curved optical substrate 20, application of the coating composition may be controlled in various regions of the optical substrate 20 to account for movement of the coating composition on a curved surface of the optical substrate 20. For example, on a convex substrate 20, the application quantity of the coating material on the radially inner portion of the optical substrate 20 may be higher than an application quantity of the coating material on a radially outer portion of the optical substrate 20 in order to form a coating layer having a uniform thickness. In various examples, the coating may have a uniform or non-uniform thickness on the optical substrate 20.

With continued reference to FIG. 3, the coating apparatus 50 includes a workpiece holder 60. In some examples, the workpiece holder 60 may be configured to securely retain the optical article 10 during the coating process. In other examples, the workpiece holder 60 may be a belt or a track for supporting a bottom surface of the optical article 10. A plurality of optical articles 10 may be removably secured to the workpiece holder 60. Each optical article 10 is retained within the workpiece holder 60 such that a surface of the optical article 10 to be coated ("the coating surface 45") is facing the coating apparatus 50. In some examples, a plane of the coating surface 45 may be substantially perpendicular to the downwards direction of the coating being applied by the coating apparatus 50. In other examples, the plane of the coating surface 45 may be angled relative to a direction of the coating being applied by the coating apparatus 50. In some examples, the workpiece holder 60 may be configured to retain a frame, such as an eyeglass frame, having the optical article 10 mounted therein. A plurality of frames may be removably secured within the workpiece holder 60.

The workpiece holder 60 may be fixed or movable relative to the coating apparatus 50. In one example, the workpiece holder 60, along with the optical substrate 20 secured thereto, is held stationary in a fixed position, while the coating apparatus 50 is translated or rotated relative to the workpiece holder 60 in one, two, or three axes to position the coating apparatus 50 in a desired position relative to the workpiece holder 60 and the optical substrate(s) 20. In another example, the workpiece holder 60 may be translated or rotated in one, two, or three axes relative to a fixed coating apparatus 50 to position the workpiece holder 60 and the optical substrate(s) in a desired position relative to the coating apparatus 50. In further examples, both the workpiece holder 60 and the coating apparatus 50 may be movable, such as by translational or rotational movement. In this manner, the workpiece holder 60 and the coating apparatus 50 may have up to six degrees of freedom (translation in three axes and rotation about three axes) to move in order to position the coating apparatus 50 in a predetermined position relative to the optical substrate(s) 20. The workpiece holder 60 and the coating apparatus 50 may be moved manually, or their movement may be controlled by one or more motors in electronic communication with a controller. The movement of the workpiece holder 60 and the coating apparatus 50 may be predetermined, such as by computer-executable instructions executed by a controller.

An uncoated substrate 20 may be loaded into the workpiece holder 60 prior to coating the surface of the optical substrate 20 using the coating apparatus. The coated substrate 20 may then be optionally removed from the workpiece holder 60 for further processing, as described herein. In some examples, a plurality of workpiece holders 60 (not shown) may be provided on a continuously moving line such that a plurality of optical substrates 20 may be coated in a continuous process.

With continued reference to FIG. 3, the coating apparatus 50 may have a controller 70 for controlling the operation of the coating apparatus 50. The controller 70 may be configured for controlling the coating operations, such as a delivery of one or more coating compositions to the coating apparatus 50, flow rate of the one or more coating compositions, and various parameters relating to application of the one or more coating compositions using the coating apparatus 50. The controller 70 may also control movement operations of the workpiece holder 60 and/or the coating apparatus 50.

Heat Source and Irradiating Process

As discussed herein, the present invention is directed to a method and apparatus for preparing an optical article 10 which, upon exposure to actinic radiation, has a pattern, such as a linearly gradient pattern, on a surface of the optical article 10. For purposes of the present invention, the gradient pattern is achieved through controlling a diffusion of an imbibition dye in an imbibition composition, by controlling the exposure of a substrate coated with the imbibition composition to a heat source, in such a way so as to create a gradual variation in hue and/or color density or polarization over an area of the optical article 10 when the optical article 10 is exposed to actinic radiation.

Following application of the imbibition composition to the surface(s) of the optical substrate 20, the imbibition composition is diffused into the optical substrate 20 by heating at least a portion of the optical substrate 20 at a temperature below the boiling temperature of the imbibition dye(s) used. The temperatures to which the coated optical substrate 20 is heated will vary and depend on the boiling point and vapor pressure of the particular imbibition dye(s) utilized, as well as the softening temperature of the optical substrate 20. Such temperatures should preferably be near to but below the boiling point of the imbibition dye(s) and below the softening temperature of the optical substrate 20. Moreover, such temperatures, i.e., photochromic transfer or incorporation temperatures, should be such as to avoid decomposition (pyrolysis) of the imbibition dye(s). Hence, the transfer temperatures chosen are sufficient to raise the vapor pressure of the imbibition dye(s) adequately to permit its transfer into the optical substrate 20 without significant decomposition to the compounds and softening of the optical substrate 20.

Figure 4:
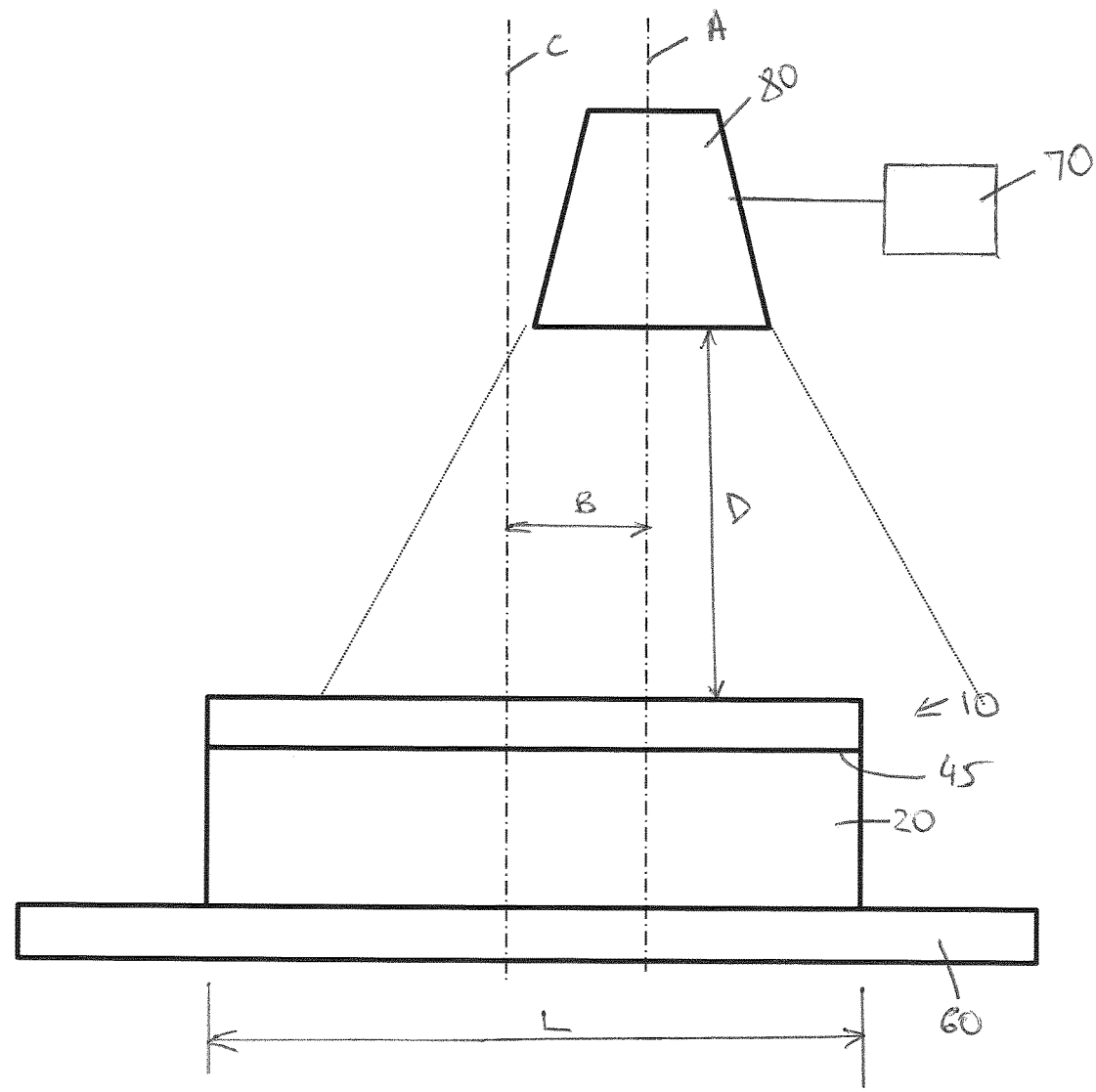
FIG. 4 is a representative side view of a heat source for irradiating at least a portion of a coated optical article in accordance with one example of the present invention.

With reference to FIG. 4, heating can be accomplished with a heat source 80. The heat source 80 is configured for irradiating with electromagnetic energy at least a portion of the optical substrate 20 that has been coated with an imbibition composition having an imbibition dye. The heat source 80 is configured to irradiate at least a portion of at least one surface of the coated optical substrate with electromagnetic energy to cause the imbibition dye(s) of the imbibition composition to diffuse into the optical substrate 20. A controller may control the output of the heat source 80 to control an amount of electromagnetic energy to which the optical substrate 20 is exposed. In various examples, the heat source 80 may be an infrared heat source, a convection heat source, or a microwave heat source. It is appreciated that the heat source 80 may be configured as a combination of these heat sources. The heat source 80 may have one or more heating elements having a linear or curved profile.

The coated optical substrate 20 is maintained at the above-described temperatures, for a time sufficient to allow a substantial portion of the imbibition dye(s) to diffuse into and penetrate beneath the surface of the optical substrate 20. The length of time during which the optical substrate 20 is irradiated with electromagnetic energy from the heat source 80 is desirably selected to cause diffusion of the imbibition dye(s) in the imbibition composition applied to the at least one imbibable surface of the optical substrate 20. Heating may also be accomplished in a vacuum or with use of an inert, e.g., nitrogen atmosphere.

With continued reference to FIG. 4, the heat source 80 may be offset relative to the optical substrate 20. For example, a central axis A of the heat source 80 may be offset by a predetermined offset B from a central axis of the optical substrate 20. In various examples, the predetermined offset B may be expressed as a percentage of an overall longitudinal length L of the optical substrate 20 at which the central axis A of the heat source 80 is offset relative to the central axis C of the optical substrate 20. For example, the central axis A of the heat source 80 may be offset laterally relative to the central axis C of the optical substrate 20 by 10 percent to 1000 percent of the overall longitudinal length L of the optical substrate 20, preferably by 30 percent to 90 percent. In other examples, a distance D between the optical substrate 20 and the heat source 80 may be from a minimum of 100 mm to a maximum of 10000 mm, preferably from 500 mm to 5000 mm.

Figure 5:
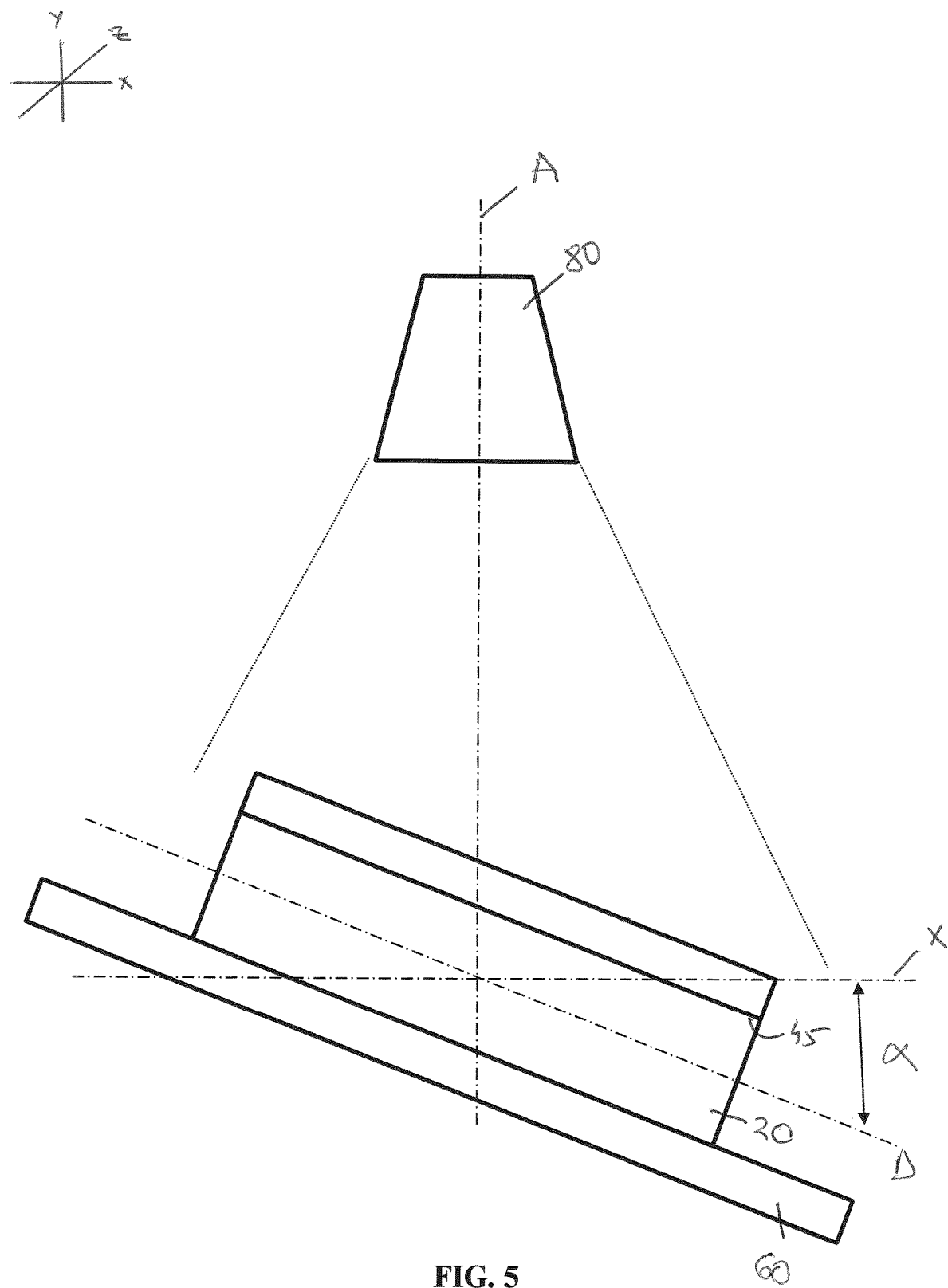
FIG. 5 is a representative side view of a heat source for irradiating at least a portion of a coated optical article in accordance with another example of the present invention.

With reference to FIG. 5, the heat source 80 and the optical substrate 20 may be angled relative to one another. For example, a longitudinal axis D of the optical substrate 20 may be offset relative to the X-axis at a predetermined angle α. In various examples, an absolute value of the predetermined angle α may be 10° to 80°, preferably by 30° to 60°. In some examples, the heat source 80 and the optical substrate 20 may be offset relative to one another, such as shown in FIG. 4, and angled relative to one another, such as shown in FIG. 5.

The offset of the heat source 80 relative to the optical substrate 20 forms a heat gradient across the optical substrate 20, such as the at least one imbibable surface of the optical substrate 20. The heat gradient across the at least one imbibable surface of the optical substrate 20 causes the imbibition dye(s) in the imbibition composition to diffuse into the imbibable surface of the optical substrate 20 in a manner that corresponds to the heat gradient. In this manner, a concentration gradient of the imbibition dye(s) that is diffused into the at least one imbibable surface of the optical substrate 20 corresponds to the heat gradient across the at least one imbibable surface. As described herein, the concentration gradient of the imbibition dye(s) forms a gradient pattern upon exposure of the optical article 10 to actinic radiation. The gradient pattern may be fixed (such as when a conventional dye or dichroic dye is used), variable in response to actinic radiation (such as when a photochromic or photochromic-dichroic dyes is used), or a combination of the two when more than one type of imbibition dye is used.

In various examples, the heat gradient across the at least one imbibable surface of the optical substrate 20 can be controlled by increasing or decreasing an output of the heat source 80. In addition, or alternatively, the heat gradient across the at least one imbibable surface of the optical substrate 20 can be controlled by increasing or decreasing the distance D between the optical substrate 20 and the heat source 80. In addition, or alternatively, the heat gradient across the at least one imbibable surface of the optical substrate 20 can be controlled by increasing or decreasing the predetermined offset B between the optical substrate 20 and the heat source 80. In addition, or alternatively, the heat gradient across the at least one imbibable surface of the optical substrate 20 can be controlled by increasing or decreasing a time of exposure of the optical substrate 20 to the electromagnetic energy from the heat source 80.

The heat source 80 and/or the workpiece holder 60 supporting the optical substrate 20 may be movable in a lateral direction (X-axis in FIG. 4) to position the heat source 80 at a desired lateral offset relative to the optical substrate 20. In some examples, the heat source 80 and/or the workpiece holder 60 supporting the optical substrate 20 may also or alternatively be movable in a vertical direction (Y-axis in FIG. 4) to position the heat source 80 at a desired vertical offset relative to the optical substrate 20. In further examples, the heat source 80 and/or the workpiece holder 60, supporting the optical substrate 20, may also or alternatively be rotatable about the (Z-axis in FIG. 4) to position the heat source 80 at a desired angular position relative to the optical substrate 20. In one example, the workpiece holder 60, along with the optical substrate 20 supported thereon, is held stationary in a fixed position, while the heat source 80 is translated or rotated relative to the workpiece holder 60 in one, two, or three axes to position the heat source 80 in a desired position relative to the workpiece holder 60 and the optical substrate 20. In another example, the workpiece holder 60 may be translated or rotated in one, two, or three axes relative to a fixed heat source 80 to position the workpiece holder 60 and the optical substrate 20 in a desired position relative to the heat source 80. In further examples, both the workpiece holder 60 and the heat source 80 may be movable, such as by translational or rotational movement. In this manner, the workpiece holder 60 and the heat source 80 may have up to six degrees of freedom (translation in three axes and rotation about three axes) to move in order to position the heat source 80 in a predetermined position relative to the optical substrate 20.

In some examples, the workpiece holder 60 and/or the heat source 80 may be held stationary relative to one another when the optical substrate 20 is irradiated with electromagnetic energy from the heat source 80. In other examples, the workpiece holder 60 and/or the heat source 80 may be moved relative to one another as the optical article 20 is irradiated with electromagnetic energy from the heat source 80. For example, the speed at which the workpiece holder 60 and/or the heat source 80 move relative to one another may be constant or varied during the irradiation process. The speed at which the workpiece holder 60 and/or the heat source 80 move relative to one another may depend on a concentration of the imbibition dye, temperature of the heat source 60, and/or relative ease of diffusion of the imbibition dye into the optical substrate 20. The workpiece holder 60 and the heat source 80 may be moved manually, or their movement may be controlled by one or more motors in electronic communication with a controller. The movement of the workpiece holder 60 and the heat source 80 may be predetermined, such as by computer-executable instructions executed by a controller.

With continued reference to FIG. 4, the heat source 80 may have the controller 70 for controlling the operation of the heat source 80. The controller 70 may be configured for controlling the output of the heat source 80, position of the heat source 80 relative to the optical substrate 20, and various parameters relating to irradiating at least a portion of at least one surface of the optical substrate 20 with electromagnetic energy using the heat source 80.

In some examples, a plurality of heat sources 80 may be arranged in an array. The plurality of heat sources 80 may be arranged parallel or offset to one another in one or more rows and/or columns. The heat sources 80 may be offset from one another at a distance from a minimum of 1 mm to a maximum of 1000 mm, preferably from 100 mm to 500 mm.

Removal of Residual Components

Following transfer of the imbibing dye(s) into the optical substrate 20, the residual coating or film is removed from the surface of the optical substrate 20. Removal of the residual coating or film may be accomplished by any suitable technique; preferably a technique that does not impair the optical quality of the surface of the optical substrate 20. Conveniently, the residual coating or film is stripped from the optical substrate 20 by contacting the residual coating or film with a suitable solvent, such as soapy water or organic solvents such as trichloroethylene, methylethylketone, methylisobutylketone, methylethylketone-toluene mixture, or other solvents such as: acetone, ethylene dichloride, chloroform and chlorobenzenes. The same solvent used to prepare the imbibition composition may be used to remove the residual coating or film. A suitable method for contacting the residual coating or film with organic solvent is in a vapor degreasing unit wherein the coated substrate is exposed to the vapors of the selected solvent(s) which condense on and run off the surface of the optical substrate 20, thereby washing the photochromic and/or KEA-depleted resin film or coating from the surface. Alternatively, the residual coating or film can be removed by dipping the optical substrate 20 into a bath of the solvent, spraying the solvent on the coated substrate or physically stripping the film or coating from the optical substrate 20. After the residual coating or film has been removed from the surface of the optical substrate 20, the surface can be washed with water, solvent or a suitable aqueous medium such as, for example, soap or detergent solutions, and dried.

Example

An imbibing solution of photochromic dyes was prepared with the ingredients in listed in Table 1 below.

TABLE 1

| Imbibing solution | |
|---|---|
| Component | Parts by weight |
| Photochromic dyes[1] | 3.00 |
| n-Methyl pyrrolidone | 11.65 |
| Tetrahydrofurfuryl alcohol | 23.31 |
| Diglyme | 27.19 |
| Ethyleneglycol n-butyl ether | 15.54 |
| TINUVIN ® 144[2] | 1.50 |
| Silica | 1.61 |
| Hydroxypropyl cellulose | 11.19 |
| Polycaprolactone[3] | 5.00 |

[1]A mixture of organic photochromic dyes formulated to give a grey color on activation.
[2]A hindered amine ultraviolet light stabilizer available from Ciba-Geigy Corporation.
[3]Molecular weight 550.

A CR-607 lens of diameter 76 mm (Base 5 curvature), available from PPG Industries, Inc., was spin coated with the imbibing solution prepared in accordance with Table 1 above.

The coated lens was placed in a fume hood with a face velocity of 1.05 m/s. A preheated Strip IR lamp (model 4185-16-1600), available from Control IR Infrared Heaters, was used as a heat source and arranged 10 cm above the highest point of the lens surface, and 3 cm off-center of the lens. Irradiance was set to 30% using a Control IR Unit Model 5420-240-0 from Control IR Infrared Heaters. The lens was heated for 2.5 hours.

The surface temperature of the lens portion closest to the heat source (measured near the edge) was measured as 140° C. using an IR thermometer. The surface position farthest from the heat source was measured to be 60° C. Following the 2.5 hour heat exposure, the lens was allowed to cool, and residual resin was removed from the lens by hand using a sponge and de-ionized water.

The lens was subsequently surfaced and coated with an anti-reflective coating Green AR by Omega Optix.

The finished lens was activated using a UV light source. The activated lens demonstrated an aesthetically acceptable color gradient, where the darkest area corresponded to the portion of the lens exposed to the highest temperature. A faint lighter colored ring was evident around the perimeter of the lens in the photochromic area only. This ring was approximately 5 mm wide.

In various examples, the present invention may be further characterized by one or more of the following clauses:

Clause 1. A method of producing an optical article, the method comprising:

applying an imbibition composition comprising at least one dye onto at least a portion of at least one imbibable surface of a substrate to form a coated substrate;

irradiating at least a portion of the coated substrate with heat from a heat source to form a heat gradient across the coated substrate to diffuse the at least one dye into the imbibable surface to form an at least partially imbibed substrate having a dye concentration gradient corresponding to the heat gradient; and removing a residual component of the imbibition composition from the at least partially imbibed substrate, wherein the dye concentration gradient forms a gradient pattern upon exposure to actinic radiation.

Clause 2. The method of clause 1, wherein the imbibable surface is a surface of an imbibable substrate.

Clause 3. The method of clause 1, wherein the imbibable surface is a surface of an imbibable layer located on optical article.

Clause 4. The method of any of clauses 1-3, wherein the heat gradient is altered by increasing or decreasing a heat output of the heat source.

Clause 5. The method of any of clauses 1-4, wherein the heat gradient is altered by increasing or decreasing a distance between the substrate and the heat source.

Clause 6. The method of any of clauses 1-5, wherein the heat gradient is altered by increasing or decreasing an angle between the substrate and the heat source.

Clause 7. The method of any of clauses 1-6, wherein the heat gradient is altered by increasing or decreasing a time of exposure of the substrate to the heat from the heat source.

Clause 8. The method of any of clauses 1-7, wherein a central portion of the heat source is offset relative to a central portion of the substrate.

Clause 9. The method of any of clauses 1-8, wherein the imbibition composition is applied by a method selected from the group consisting of spin coating, spray coating, inkjet coating, curtain coating, or dip coating.

Clause 10. The method of any of clauses 1-9, wherein the heat source is selected from the group consisting of an infrared heat source, a convection heat source, and a microwave heat source.

Clause 11. The method of any of clauses 1-10, wherein the heat source is curved.

Clause 12. The method of any of clauses 1-11, wherein the at least one dye is selected from the group consisting of a fixed tint dye, a photochromic dye, a dichroic dye, and a photochromic dichroic dye.

Clause 13. The method of any of clauses 1-12, wherein the substrate is an anisotropic imbibable substrate and wherein the imbibition composition comprises at least one dichroic dye such that the at least partially imbibed substrate has a polarized gradient pattern.

Clause 14. The method of any of clauses 1-12, wherein the substrate is an anisotropic imbibable substrate and wherein the imbibition composition comprises at least one photochromic dichroic dye such that the at least partially imbibed substrate has a photochromic polarized gradient pattern upon exposure to actinic radiation.

Clause 15. The method of any of clauses 1-14, wherein the imbibition composition further comprises at least one of an ultraviolet absorber composition, an antioxidant composition, hydroxypropyl cellulose, a hindered amine light stabilizer, a kinetic enhancing additive, and a solvent.

Clause 16. An optical article having a gradient pattern, the optical article obtainable by the method of any of clauses 1-15.

The present invention has been described with reference to specific details of particular examples thereof. It is not intended that such details be regarded as limitations upon the scope of the invention except insofar as and to the extent that they are included in the accompanying claims.

What is claimed is:

1. A method of producing an optical article, the method comprising:

applying an imbibition composition comprising at least one dye onto at least a portion of at least one imbibable surface of a substrate to form a coated substrate;

irradiating at least a portion of the coated substrate with heat from a heat source to form a heat gradient across the coated substrate to diffuse the at least one dye into the imbibable surface to form an at least partially imbibed substrate having a dye concentration gradient corresponding to the heat gradient; and removing a residual component of the imbibition composition from the at least partially imbibed substrate, wherein the dye concentration gradient results in a gradient pattern upon exposure to actinic radiation, and wherein a central portion of the heat source is offset relative to a central portion of the coated substrate and the coated substrate is held stationary relative to the heat source when the coated substrate is irradiated.

2. The method of claim 1, wherein the imbibable surface is a surface of an imbibable substrate.

3. The method of claim 1, wherein the imbibable surface is a surface of an imbibable layer located on the optical article.

4. The method of claim 1, wherein the heat gradient is altered by increasing or decreasing a heat output of the heat source.

5. The method of claim 1, wherein the heat gradient is altered by increasing or decreasing a distance between the substrate and the heat source.

6. The method of claim 1, wherein the heat gradient is altered by increasing or decreasing an angle between the substrate and the heat source.

7. The method of claim 1, wherein the heat gradient is altered by increasing or decreasing a time of exposure of the substrate to the heat from the heat source.

8. The method of claim 1, wherein the imbibition composition is applied by a method selected from the group consisting of spin coating, spray coating, inkjet coating, curtain coating, and dip coating.

9. The method of claim 1, wherein the heat source is selected from the group consisting of an infrared heat source, a convection heat source, and a microwave heat source.

10. The method of claim 1, wherein the heat source is curved.

11. The method of claim 1, wherein the at least one dye is selected from the group consisting of a fixed tint dye, a photochromic dye, a dichroic dye, and a photochromic dichroic dye.

12. The method of claim 1, wherein the substrate is an anisotropic imbibable substrate and wherein the imbibition composition comprises at least one dichroic dye such that the at least partially imbibed substrate has a polarized gradient pattern.

13. The method of claim 1, wherein the substrate is an anisotropic imbibable substrate and wherein the imbibition composition comprises at least one photochromic dichroic dye such that the at least partially imbibed substrate has a photochromic polarized gradient pattern upon exposure to actinic radiation.

14. The method of claim 1, wherein the imbibition composition further comprises at least one of an ultraviolet absorber composition, an antioxidant composition, hydroxypropyl cellulose, a hindered amine light stabilizer, a kinetic enhancing additive, or a solvent.

* * * * *